United States Patent Office 3,555,046
Patented Jan. 12, 1971

3,555,046
PLICATIN TETRA-ACETATE AND PROCESS FOR ITS PRODUCTION
Donald W. Langille, Vancouver, British Columbia, Canada, assignor to ITT Rayonier Incorporated, a corporation of Delaware
No Drawing. Continuation-in-part of application Ser. No. 425,066, Jan. 12, 1965. This application Jan. 26, 1967, Ser. No. 611,814
Int. Cl. C07d 5/06
U.S. Cl. 260—343.3
4 Claims

ABSTRACT OF THE DISCLOSURE

This invention provides compounds derived from plicatic acid, particularly plicatin tetra-acetate, and a process for producing them. The process comprises the acetylation of sodium or potassium plicatate with acetic acid and pyridine under anhydrous conditions at ambient temperatures, preferably at 10° to 40° C. to produce plicatin tetra-acetate, indicated by analyses as $(C_{28}H_{28}O_{13} \cdot H_2O)$, in good yield. The invention also produces a by-product compound closely resembling plicatin tetra-acetate indicated by analyses as $(C_{30}H_{32}O_{15})$. Plicatin tetra-acetate is useful as an intermediate for forming other compounds or products such as paint pigments and dyes, and as a plasticizer and stabilizer for plastics such as cellulose acetate, polyesters, vinyl resins and similar products.

---

This application is a continuation-in-part of my copending application Ser. No. 425,066, filed Jan. 12, 1965, now abandoned. In my said patent application I describe the production of certain compounds from plicatic acid including a colorless, crystalline acetate of plicatic acid, and other compounds not then fully identified.

Plicatic acid is a compound understood to be 1,2,3,4-tetrahydro - 6 - methoxy-7-hydroxyl-1-(3',4'-dihydroxy-5'-methoxyphenyl)-2,3 dihydroxy-3 hydroxymethyl-2-naphthoic acid, which can be represented by the structural formula

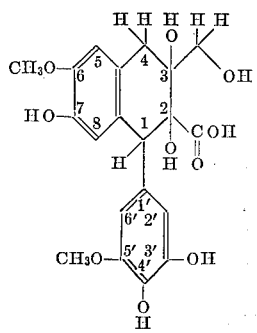

Plicatin tetra-acetate is a water insoluble compound which crystallizes (from water-methanol) with one mole of water as evidenced by the analysis for $C_{28}H_{28}O_{13} \cdot H_2O$. The plicatin tetra-acetate in deuteroacetone was investigated by nuclear magnetic resonance, infrared and chemical analyses. It has accordingly been determined that plicatin tetra-acetate is a compound which can be represented by the following formula:

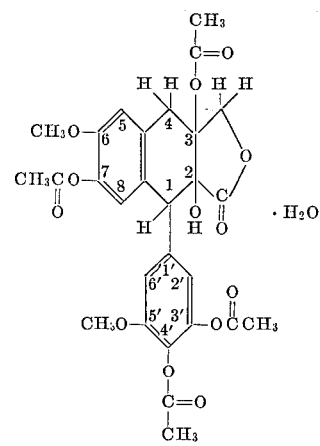

One important aspect of the invention is the production of a by-product closely resembling the plicatin tetra-acetate which is formed in the solution from which the plicatin tetra-acetate is crystallized.

The by-product has been subjected to the same investigations, with the difference that the nuclear magnetic resonance was measured in deutero-chloroform, which suggests a compound that can be represented by the following formula:

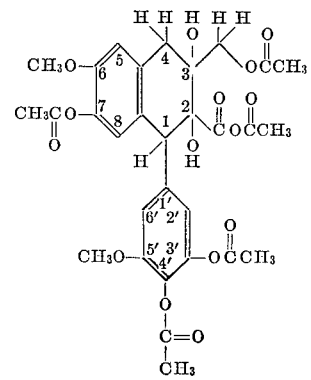

The foregoing structure is also indicated by the chemical analysis of $(C_{30}H_{32}O_{15})$.

Yields of plicatin tetra-acetate as high as about 70% on the original plicatic acid or even higher can be obtained by acetylation of sodium or potassium plicatate in dry pyridine with an excess of acetic anhydride. Neither plicatic acid or plicatin, as such, are satisfactory starting materials. The acetylation reaction is strongly exothermic and maximum yields are obtained at from about 10° to 40° C. As a result I have found it preferable to slowly add cold acetic anhydride in excess to a cooled mixture of the sodium or potassium plicatate in an excess of dry pyridine with constant agitation to avoid local overheating and to promote uniformity of reaction. The yield of desired product drops off sharply as the temperature rises above 40° C. to almost nothing at 100° C. with the formation of increasing amounts of tars. Below 10° C. the acetylation reaction becomes too slow for practical purposes. On completion of the acetylation the solution is permitted to stand at room temperature for some time after which crystalline plicatin tetra-acetate is filtered out of the solution, washed with isopropanol and water and dried.

The mother liquor from the foregoing acetylation after filtering off the plicatin tetra-acetate contains the by-product of the invention. The by-product can be obtained by precipitating it from the mother liquor with water or by evaporating said mother liquor to dryness and recrystallization of said by-product from isopropanol or from acetic acid-water solution. The crystals melt 158–160° C. and have a dextrorotation in glacial acetic acid, $$[\alpha]_D^{25.5} + 107.5°$$

(c., 2 glacial acetic acid). In this manner, yields of 40 to 50% on the weight of the original plicatic acid are obtained.

The plicatin tetra-acetate has many uses: as an intermediate for forming other compounds or products such as paint pigments and dyes, and as a plasticizer and stabilizer for plastics such as cellulose acetate, polyesters, vinyl resins and similar products.

The following examples illustrates a process of the invention for producing plicatin tetra-acetate:

EXAMPLE I 196 g. of potassium plicatate was stirred into 400 ml. of dry pyridine in a suitable reactor in a cooling bath and 300 ml. of acetic anhydride added dropwise with stirring over a period of 75 minutes. After standing overnight 400 ml. each of isopropanol and water were added to decompose excess acetic anhydride. The mixture was stirred for 30 minutes, permitted to stand for about 2 hours and the precipitate of crystalline plicatin tetra-acetate filtered off, washed with isopropanol, then with a 1 to 1 mixture of isopropanol and water and finally dried in vacuo at 60° C. 129 grams of the crystalline plicatin tetra-acetate was recovered which was 71 percent by weight based on the plicatic acid equivalent of the potassium plicatate. A sample of the product was recrystallized three times, and gave a sharp melting point (Leitz hot-stage) of 198–200° C. It is laevorotary in glacial acetic acid $[\alpha]_D^{25.5} -24.5°$ (c., 2 glacial acetic acid).

EXAMPLE II 11.5 grams of crystalline potassium plicatate was added to 40 ml. of dry pyridine and the mixture cooled to 15° C. 23.4 ml. of cold acetic anhydride was then slowly stirred into the mixture in small portions. After standing overnight, the precipitate of plicatin tetra-acetate was filtered off and removed. The yield after washing with isopropanol and water and drying in vacuo was 5.67 grams equivalent to 54.5% on the weight of the starting plicatic acid.

The filtrate (mother liquor) was evaporated on a vacuum rotor to a solid, smelling of pyridine and weighing 8.86 grams. From this solid 3.8 grams of by-product equivalent to 51.5% on the plicatic acid was recovered by recrystallizing from isopropanol with a decolorizing by Darco KB. (The by-product can also be recovered by recrystallizing from acetic acid-water solution at a ratio of about 1/4.)

The parent application Ser. No. 425,066, filed Jan. 12, 1965 discloses the production of two derivatives of plicatic acid. At the time said parent application was filed structural formulae for the compounds were not available. By means of nuclear magnetic resonance investigations coupled with infrared and chemical analysis, I have now been able to determine their structures with considerable certainty.

The compound formed by the acetylation of plicatic acid with acetic anhydride in ethyl acetate using HClO₄ as catalyst can be represented by the following structural formula.

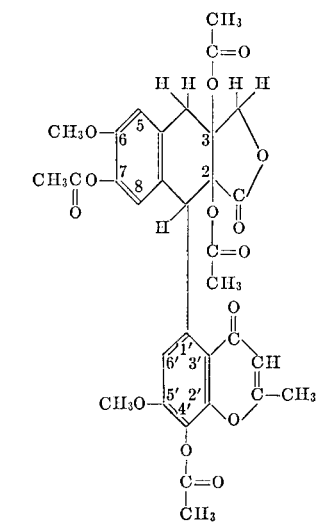

It is strongly dextrorotary in dimethylformamide, $$[\alpha]_D^{25.5} + 193.5°$$

(c., 2 dimethylformamide).

The yellow crystalline deacetylation compound formed by dissolving the foregoing crystalline acetate in sodium hydroxide solution and neutralizing with hydrochloric acid to precipitate the same can be represented by the following structural formulae:

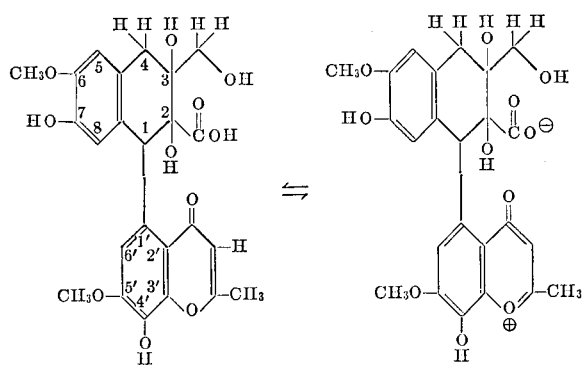

Shown is a simplified version of zwitterion formation in the pyrone ring that would account for its formation of stable crystalline salts with strong acids, and its solubility in basic aqueous solutions. This structure, probably planar in the pyrone ring, also accounts for its yellow color, and provides some explanation for the deep purple colors of its acyl and methylated derivatives. Analyses for Y assuming a formula as above of $C_{24}H_{24}O_{11}$ and a molecular weight of 488.4 are:

*Analysis.*—Theory (percent): C, 59.01; H, 4.95; methoxyl, 12.69; acetyl, nil. Found (percent): C, 59.04 RCR; H, 4.94 RCR; methoxyl, 12.64 RCR; acetyl, nil RCR.

I claim:
1. The compound plicatin tetra-acetate represented by the formula

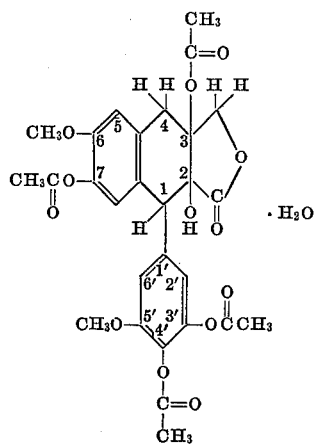

2. The process for forming plicatin tetra-acetate which comprises reacting potassium or sodium plicatate with acetic anhydride in pyridine at a temperature of from 10° to 40° C., and precipitating from the solution crystalline plicatin tetra-acetate.

3. The process for forming plicatin tetra-acetate which comprises adding potassium or sodium plicatate to a mixture of an excess acetic anhydride and pyridine at a temperature of from 10° to 40° C., and precipitating crystals of plicatin tetra-acetate.

4. The process for forming plicatin tetra-acetate which comprises slowly adding an excess of acetic anhydride with agitation to a mixture of potassium or sodium plicatate in an excess of dry pyridine at a temperature of from 10° to 40° C. and precipitating crystals of plicatin tetra-acetate.

References Cited

Wagner and Zook: Synthetic Organic Chemistry, New York, Wiley & Sons, 1953, (pp. 482–483 and 533–534 relied on).

ALEX MAZEL, Primary Examiner

A. M. T. TIGHE, Assistant Examiner

U.S. Cl. X.R.
260—30.4, 479